United States Patent [19]

Borg

[11] Patent Number: 5,625,716
[45] Date of Patent: Apr. 29, 1997

[54] METHOD FOR COMPENSATING FOR TRANSFER CHARACTERISTICS OF A PRINTING SYSTEM IN A HALFTONE SCREENING PROCESS

[75] Inventor: Lars Borg, Los Altos, Calif.

[73] Assignee: Adobe Systems Incorporated, San Jose, Calif.

[21] Appl. No.: 213,443

[22] Filed: Mar. 15, 1994

[51] Int. Cl.$^6$ .............................. G06K 9/40; G06K 9/38
[52] U.S. Cl. ..................... 382/254; 382/270; 358/456
[58] Field of Search .................... 382/50, 54, 270, 382/254, 252, 274, 275; 358/456, 457–460

[56] References Cited

U.S. PATENT DOCUMENTS

| | | | |
|---|---|---|---|
| 5,177,623 | 1/1993 | Hizota | 358/457 |
| 5,200,831 | 4/1993 | Tai | 358/457 |
| 5,255,085 | 10/1993 | Spence | 358/527 |
| 5,259,042 | 11/1993 | Matsuki et al. | 382/50 |
| 5,291,311 | 3/1994 | Miller | 358/457 |
| 5,309,246 | 5/1994 | Barry et al. | 358/459 |
| 5,369,506 | 11/1994 | Takenchi | 358/458 |
| 5,396,607 | 3/1995 | Shimatani | 358/458 |

*Primary Examiner*—Leo Boudreau
*Assistant Examiner*—Bipin Shalwala
*Attorney, Agent, or Firm*—Fish & Richardson, P.C.

[57] ABSTRACT

A method of compensating for a predetermined transfer characteristic of a printing device in a halftoning process for screening an image containing a particular gray level value selected from a predetermined finite number of gray level values, including the steps of (1) selecting for the particular gray level value a bit pattern from a large plurality of bit patterns which is larger than the predetermined finite number of gray levels, the selection being based upon the application of a predetermined transfer characteristic of the printing system; and (2) printing the area of the image having the particular selected gray level value using the selected bit pattern, or storing the selected bit pattern as part of a threshold array.

13 Claims, 4 Drawing Sheets

METHOD FOR COMPENSATING FOR TRANSFER CHARACTERISTICS OF A PRINTING SYSTEM IN A HALFTONE SCREENING PROCESS

BACKGROUND AND FIELD OF THE INVENTION

This invention relates to a method for compensating for the transfer characteristic of a printing device used in a halftoning process for image screening. Background for this invention may be found in the publications "PostScript Language Reference Manual, Second Edition" by Adobe Systems Incorporated (Addison-Wesley 1990) and "PostScript Screening: Adobe Accurate Screen" by Peter Fink (Adobe Press 1992).

Screening is the method used to reproduce continuous tone images and tints using technologies or media that can only represent "on" and "off" states, usually by picture elements ("pixels"). The regions of the image having continuous tones are broken into small areas or cells. The "shade" of each such area is represented by a predetermined set of device pixels such that the percentage area covered by the device pixel set equals the correct shade of gray when viewed from a distance. Although the term "gray-scale" and "gray level values" are used throughout this specification, this by no means implies that the invention is limited to monochromatic images. The gray level values, or shades of gray, may be the shades of density of a particular color in a color image. Color images are represented by the percentages of each of the color primaries making up that color, and each such primary usually has its own individual gray level.

Traditional AM screening uses variable-size halftone dots at fixed spacing in both dimensions. The size of the dot is increased by adding device pixels at its outer edge to increase the covered area. When viewed from a distance, the larger the dot size, the greater the area covered and the darker the image area. Traditional screening has been termed "AM" or amplitude modulated screening, since the variable being changed was dot size (amplitude).

More recently, as computation power has increased in screening or printing devices, AM screening is being replaced by frequency-modulated, or "FM" screening. FM screening uses a fixed-size, smaller dot at variable spacing to achieve the same effect as traditional AM screening. Variation in dot spacing varies the number of dots in a given area, or dot frequency, hence the term FM screening. The denser the dot distribution (meaning the dots are closer together), the darker the image area. On some output devices, each dot for FM screening is actually made up of four or more device pixels. FM screening provides a dot distribution based upon the shade variations in the original image. The dot distribution is optimized to be the best representation possible for the particular output device or system. The screening is not constrained to the coarser fixed grid dot pattern used in AM screening.

The benefits of FM screening are dramatic for color images where three or four primary printing colors are overlaid. FM screening more closely represents the original image, especially those images with a lot of detail.

The halftoning process is used to convert image data from a requested multilevel gray or color value into a printable pattern of bi-level or multi-level gray or color values which typically takes the form of a "printable pattern". If this printable pattern is to be made up of a series of binary pixels, then the pattern is called a "bit pattern", since a bit is binary and a binary pixel can only be either "on" or "off". Each bit represents a pixel of ink on the printed page.

If there are no bits to be printed, the page will be all white. If all the bits are to be printed, the page will be the maximum color density in the case of color, or black in the case of monochrome printing. If half the bits are turned on, the printed area should look mid-gray (or an in-between color density).

However, printable patterns can be made up of data which is not binary, where gray-scale pixels are either fully on, fully off or somewhere in between. In such cases, since screens are still made up of pixels, a dot in the printable pattern is still made up of a plurality of pixels. Stochastic screening, which is a combination of AM and FM screening, uses both variable dot size as well as variable spacing. Some stochastic approaches use adaptive algorithms to determine the best combination of dot size and placement to most faithfully reproduce the image.

Unfortunately, while the above seems simple, and should result in faithful reproduction of an image onto a printed page, in the real world, that is not the case. There is seldom a truly linear relationship between the number of bits turned on and printed in an area of the page and the actual, colorimetrically measured color value for that area. With most laser printers, printing presses and imagesetters, for example, the actual printed area is darker that it should be when the binary pixels to be printed are based solely upon the percentage of printed pixels calculated directly from the percentage gray level value. This increase in darkness has been called "dot gain". With a given fraction of bits turned on, the printed and measured gray level and the dot gain depends upon the actual bit pattern used. Dot gain is the smallest if the turned on bits are grouped in large clusters. It is worst if the printed pixels are separated by non-printed pixels. Since FM screening takes advantage of pixel separation, dot gain has become a more severe problem as FM screening has replaced AM screening in high quality printing processes. For example, an actual measured gray level of 91% has resulted from printing an area with only 50% of the dots turned on.

Dot gain is affected by many parameters. They include, but are not limited to, printing device resolution, device pixel size, printing technology (such as xerography vs. webb offset), ink characteristics, the paper used (SWOP-coated vs. newsprint) and the plate-making process. For any given bit pattern, the dot gain will vary widely across the range of parameters depending upon these variables.

Various prior art methods have been applied to deal with the dot gain problem. One such method uses the transfer function in the Adobe PostScript™ interpreter, used to generate characters and screens in many high end laser printers, imagesetters and other offset printers. This transfer function maps 256 incoming color levels to 256 outgoing color levels. While this works satisfactorily for moderate dot gains, its fails to compensate adequately for severe dot gains, because many incoming gray levels are forced to be mapped to the same outgoing gray levels. If compensation requires a shift up, for example, then the lower of the 256 outgoing levels cannot be used. This reduces the number of distinctly printable gray levels, sometimes by as much as 50%. Where the original incoming print data may have had eight bits of accuracy, when mapped onto fewer than the full 256 outgoing color levels, printing is no longer carried out with eight bits of accuracy. The result is poorer print quality with shade steps within the printed area.

With big dots, a dot gain of 20%, for example, is not too serious. However, as dots get smaller, as they do in FM screening, and where dot gains may reach 50%, the print accuracy is much more substantially and noticeably reduced from the original data with 8-bit accuracy.

Accordingly, it would be highly desirable to be able to compensate for dot gain in a screening process in a manner which did not appreciably reduce the faithfulness of the reproduction of the data being printed.

BRIEF DESCRIPTION OF THE INVENTION

Briefly, this invention provides a method for compensating for a predetermined transfer characteristic of a printing device in a halftoning process for screening an image. That image contains a particular input gray level value selected from a predetermined finite number of input gray level values.

The method of the invention starts by selecting for the particular input gray level value a bit pattern from a large plurality of bit patterns which is larger than the predetermined finite number of input gray levels. The selection of the bit pattern is based upon the predetermined transfer characteristic of the printing system. After a bit pattern has been selected for an input gray level in the image, that area of the image with that input gray level may be screened using the selected bit pattern.

The bit pattern selection can take place at different times. For example, the printing device can first be calibrated. During this calibration, bit patterns are selected from the larger plurality of bit patterns for each possible input gray level value of any image to be printed. These patterns are stored in memory and indexed. Then, when an image is to be printed, the corresponding previously selected bit pattern is used to print each input gray level value in the image. The other alternative is to do the bit pattern selection at run, or print time. In this way, for each input gray level value, a bit pattern is selected on the fly from the large plurality of bit patterns.

DETAILED DESCRIPTION OF THE PREFERRED EMBODIMENTS

Figure 1:
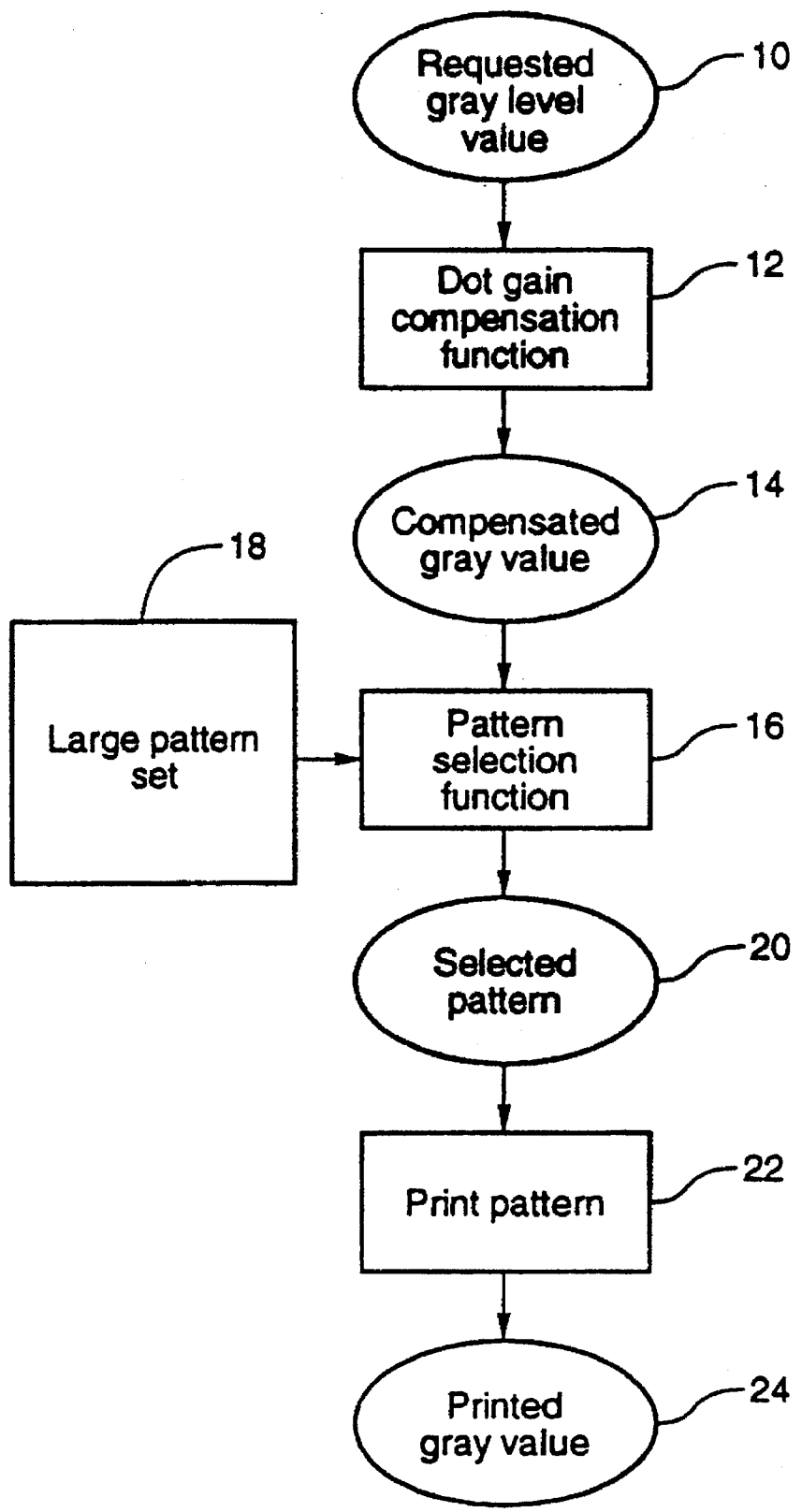
FIG. 1 is a flow chart of the run-time method of one embodiment of the invention.

While the invention is applicable to screening using a variety of environments, the preferred embodiment will be described using a PostScript™ printer.

The image to be printed is made up of a number of different gray levels, either within a monochrome image or within one component of a color. In this embodiment, there are 256 different levels. However, a gray value doesn't have to be an integer, as long as the total number of possible gray values is not unlimited. As is known to those skilled in the art, in future printers, this number may be much larger, for example 1024 or 4096 or more different color component or gray levels. The transfer characteristic of the printer is to be compensated for by selecting, for any one of these 256 gray levels, a bit pattern from a large plurality of available bit patterns. The number of bit patterns in the large plurality of bit patterns in the example using 256 different gray levels must be more than 256 and may be in the range from about 512 to 65,536 different patterns. The larger the possible selection, the clearer the printed image can be. The pattern is selected to obtain the best approximation of the input gray level in the image to be printed.

The large plurality of patterns from which the selection is made can be derived in a number of ways. For example, the first pattern may have all bits turned off, representing a white area of the page. The last pattern will have all its bits turned on, representing a black area of the page. Each non-white pattern may contain from 1 to all of the pixels in the pattern area. For practical reasons, such as memory capacity, these patterns are often limited to between about 30 and 1,000,000 pixels.

The patterns may be organized randomly and indexed by assigning an index number to each pattern. Typically the patterns are sequenced so that any pattern will print darker than its predecessor. This can be accomplished in several ways. One way is to make each successive pattern first have the same bits turned on as its predecessor, and then have one or more additional bits turned on. Arranged this way, the plurality of bit patterns may be sequenced through by gray level without actually having to measure the printed gray level from each individual pattern.

Alternatively, each derived pattern may be printed and then sorted according to actual colorimetrically measured printed gray values. However, with a large plurality of patterns in the database, this would require a great deal of work.

In the preferred approach, using sequenced patterns, the same number of bits are added to each pattern to make their printed gray levels approximately equally spaced. For example, for 1000 patterns, an additional 1/999th of the number of bits in the pattern area would be turned on for each subsequent pattern. However, these bits need not be turned on at a fixed rate. It is possible to turn on bits at varying rates, for example, to increase the rate of bits to be turned on as the number of turned-on bits in the pattern gets larger. This increase can be used to precompensate for dot gain.

Figure 4:
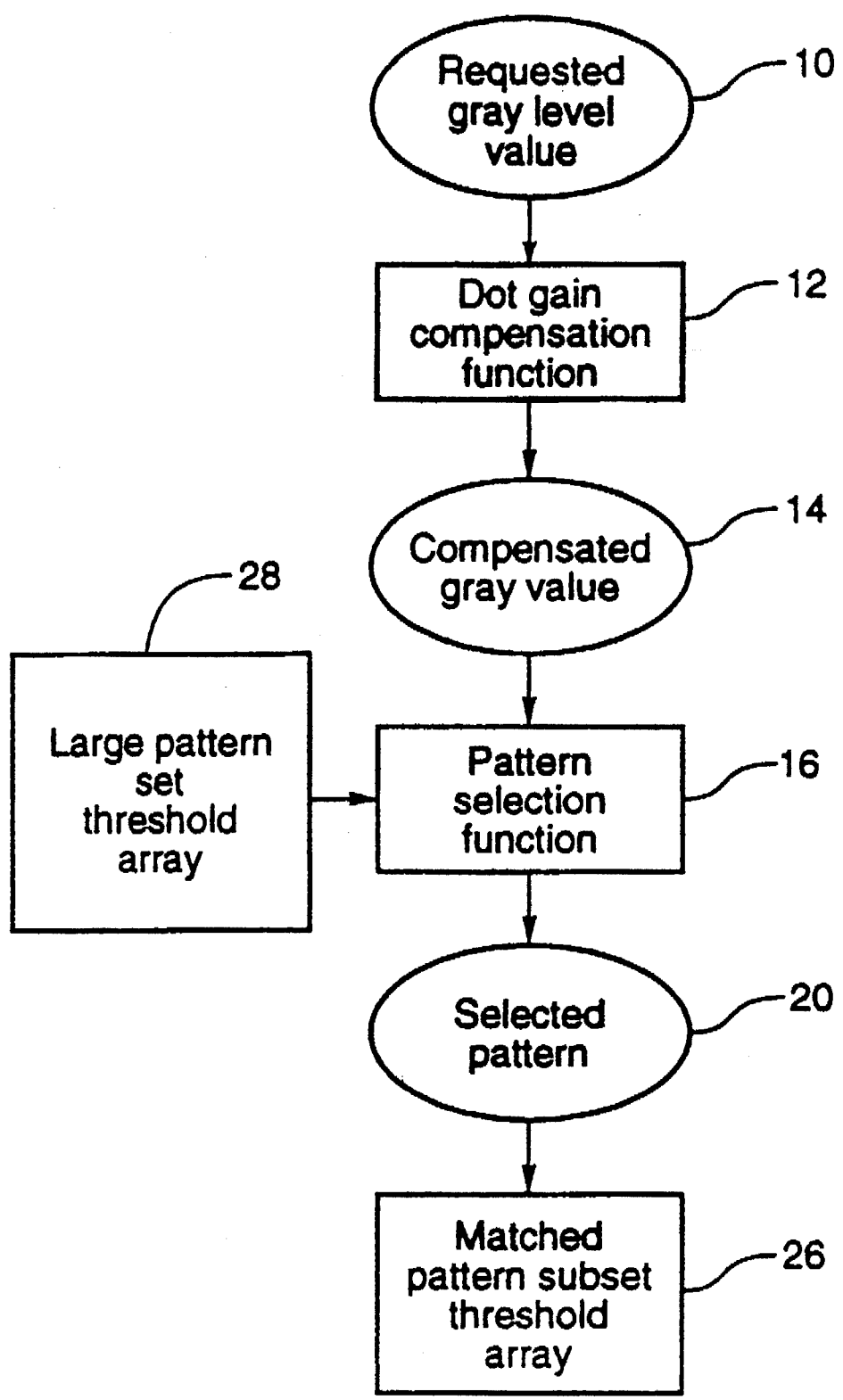
FIG. 4 is a flowchart of the calibration method of another embodiment of the invention.

Alternatively, instead of storing the bit patterns separately, they may be collectively stored as a threshold array. A threshold array is a rectangular array of pixel values which represent gray level values. For each particular gray level value, the corresponding bit pattern is the pattern derived by turning on the pixels which have values which relate to the particular gray level value. For example, pixels having values above or equal to a particular gray level value may be turned on while those having a lower value may be turned off. As a further example, the patterns 18 and 21 shown in FIG. 2 may be stored as threshold arrays 26 and 28, respectively, as shown in FIG. 4. Or the opposite relationship may be used to obtain a threshold array.

In a preferred embodiment of the invention, each bit pattern to be used for printing is selected using as the predetermined transfer characteristic a dot gain compensation function. This may be a single factor or a function derived from a curve or table. This compensation function is applied to the selected input gray value from the image to be printed. Assuming the selected image input gray value is x, after the compensation function f(x) is applied, the new value x'=f(x). X' is kept at a high resolution, for example 16–32 bits. This new value x' is then used to select a bit pattern from the large set of patterns. As explained before, this large set must be larger than 256 patterns, since there are 256 possible gray levels in the example of the preferred embodiment. Preferably the large number of possible patterns is between about 4096 and 65,536.

The preferred way to select the correct bit pattern is to convert x' to an index whose range covers all the possible patterns. The pattern selected by this index is then printed as a good approximation of the selected gray value x.

The above pattern selection can be done either at print time, or in advance in a separate calibration step. In the latter case, a pattern is selected from the large plurality of patterns for each gray level that can possibly be requested. In the PostScript® example, 256 patterns will be selected and saved for later use in production or printing. Preferably, these patterns may be stored as a threshold array. Then, during the production process, a simple pattern access mechanism retrieves the pattern which already has been associated with each possible image input gray level value during calibration.

A flow chart of the embodiment of the method of the invention, where the pattern is selected at run time, is shown in FIG. 1. The requested gray level value 10 of the image is passed to a compensation function generator 12 which outputs a compensated gray value 14. This compensated gray value is passed to the pattern selection function 16 which selects a pattern corresponding to the compensated gray level value 14 from a large pattern set 18. The selected pattern 20 emerges from the pattern selection function 16 and is passed to the print pattern step 22, which emits the printed gray value 24.

Figure 2:
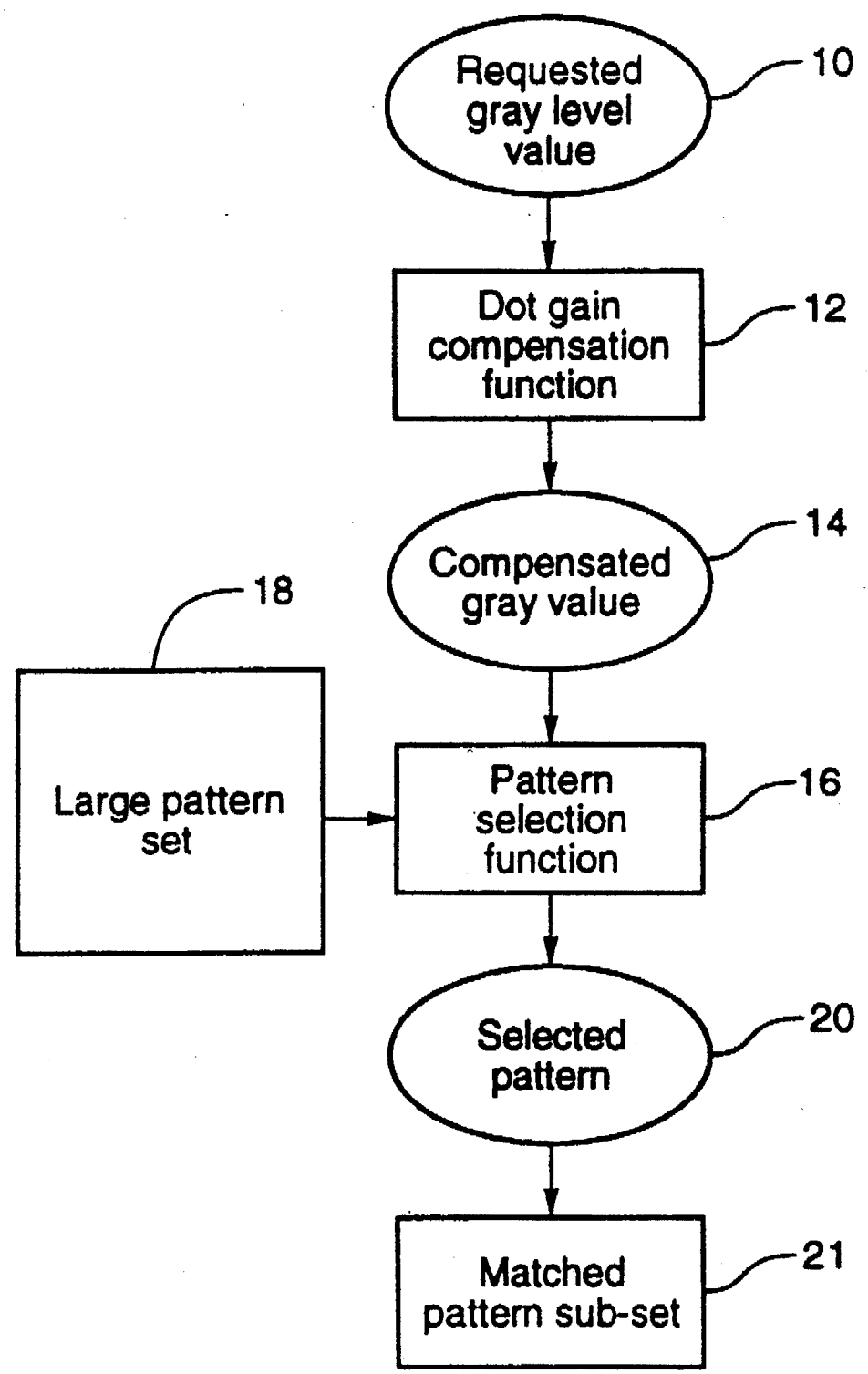
FIG. 2 is a flow chart of the calibration method of one embodiment of the invention.

A flow chart of the embodiment of the method of the invention where the printer is calibrated in advance is shown in FIG. 2. The requested input gray level value 10 of the image is passed to a compensation function generator 12 which outputs a compensated gray value 14. This compensated gray value is passed to the pattern selection function 16 which selects a pattern corresponding to the compensated gray level value 14 from a large pattern set 18. The selected pattern 20 emerges from the pattern selection function 16 and is stored as a matched pattern subset at 21.

Figure 3:
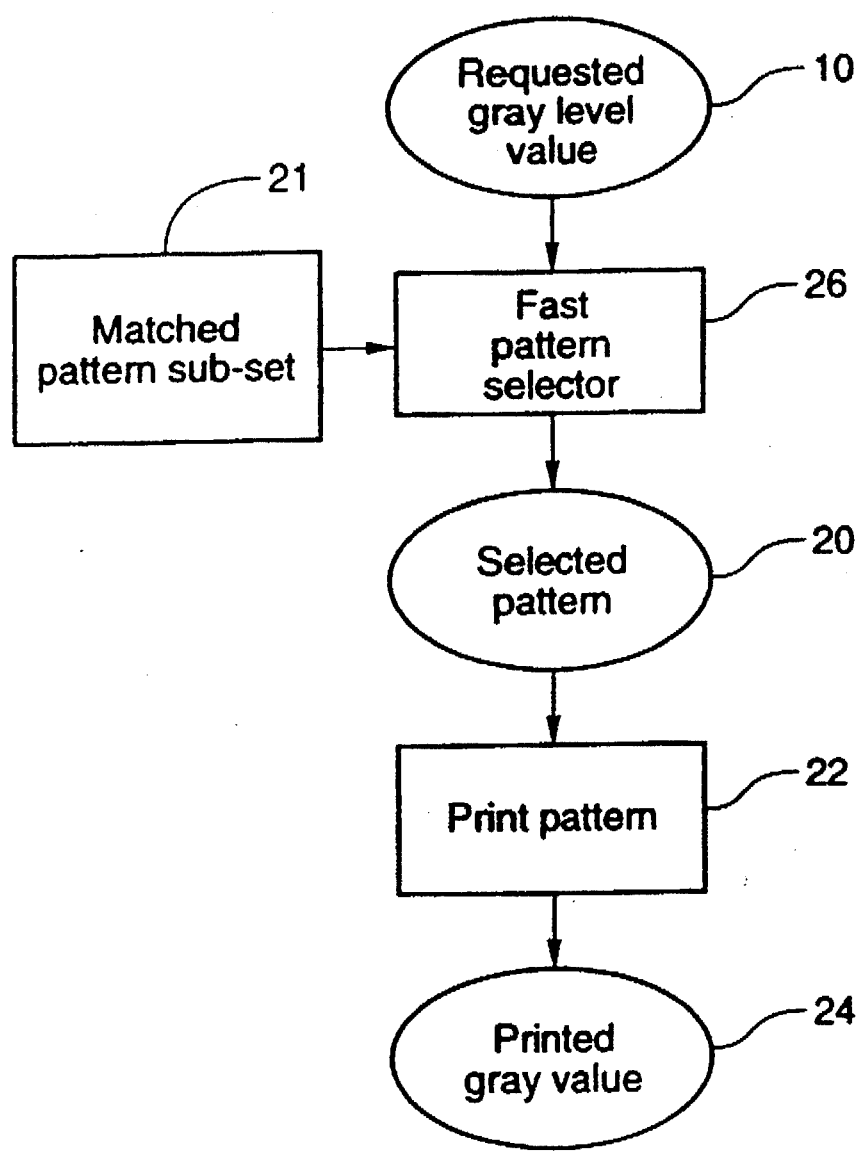
FIG. 3 is a flow chart of the printing method when the calibration method of the invention is used.

After the calibration procedure shown in FIG. 2, the printing process is streamlined as shown in FIG. 3. The calibration step of FIG. 2 provides a matched pattern subset 21, one pattern for each of the 256 possible requested gray level values 10. The requested gray level value 10 is passed to the fast pattern selector 26, which only needs to select the indexed pattern from the matched pattern subset 21, which corresponds to the requested gray level 10. Selector 26 emits the selected pattern 20, passes it to the printing function 22 where the printed gray value 24 emerges which corresponds to the input gray level of the original image.

The compensation function 12 in FIGS. 1 and 2 needs to be accurate enough to give good approximations of the original gray level value. To get these approximations over a range of printing conditions and printers, each of which may have different amounts of dot gain, the system needs a plurality of compensation functions, from 2 to about 200. The user selects the compensation function based upon the printing conditions and printer type he or she plans to use.

There are a number of ways to determine a compensation function. For example, under a given set of printing conditions and for a particular printer the user prints, using an identity compensation function, a set of sample of gray values ranging from black to white, for example, one print for each 10% interval between 0 and 100%. In this case, $f(x)=f_0(x)=x$, $x=[0, 0.1 \ldots 1]$. It is assumed that the printed gray level changes linearly for values between the selected sample values of x. If that is not the case for a given set of x, the gradations of x as set forth above, need to be made smaller until the non-linearity between the two adjacent x values can be considered negligible.

Next the printed gray level y for each requested gray level (maximum 256 in the PostScript® example) is measured. This provides a function p which characterizes the uncompensated system. Y is calculated as follows: $Y=p_A(x')=p_A(f_0(x))=p_A(x)$.

Next the compensation function is determined. This function is the inverse of $p_A(x')$, which is: $f_A(x)=p_A^{-1}(x)$. The user installs this compensation function $f_A(x)$ to modify the system's behavior, which becomes: $p_A(f_A(x))=p_A(p_A^{-1}(x))=x$. This is a linear system.

Compensation curves can also be determined analytically rather than empirically, as shown above, if the print system has known characteristics. Moreover, the above process can be used to design a non-linear system. For example, the system can be set to emulate another system with a transfer function $y=g(x)$ by setting $f_A(x)=p_A^{-1}(g(x))$, which results in a system transfer function of $p_A(p_A^{-1}(gx)))=g(x)$.

Where the term "bit pattern" was used, that term is intended to include printable patterns which contain non-binary or gray-scale pixels, as discussed above.

As will be understood by those skilled in the art, many changes in the apparatus and methods described above may be made by the skilled practitioner without departing from the spirit and scope of the invention, which should be limited only as set forth in the claims which follow.

I claim:

-1. A method of compensating for a predetermined transfer characteristic of a printing device in a halftoning process for screening an area of an image having a particular gray level value selected from a plurality of gray level values, comprising:

applying a compensation function corresponding to the predetermined transfer characteristic to the particular gray level value to enable the selection of a bit pattern from a plurality of bit patterns represented in a first threshold array, the selected bit pattern being represented in a second threshold array, the number of bit patterns in the plurality of bit patterns being greater than the number of gray level values in the plurality of gray level values, wherein the elements of the first threshold array have a depth of between 9 and 16 bits and the elements of the second threshold array have a depth of between 8 and 12 bits, the depth of the first threshold array being greater than the depth of the second threshold array; and screening the area of the image using the selected bit pattern.

2. The method of claim 1 wherein the selection of the plurality of bit patterns from the plurality of bit patterns is made during the calibration of the printing device.

3. The method of claim 1 wherein the selection of the plurality of bit patterns from the plurality of bit patterns is made during printing.

4. The method of claim 1 wherein the predetermined transfer characteristic of the printing device is a dot gain compensation function.

5. The method of claim 4 wherein the dot gain compensation function for all gray levels of the printing device is a single factor.

6. The method of claim 4 wherein the dot gain compensation function is derived from a dot gain curve.

7. The method of claim 4 wherein the dot gain compensation function is derived from a dot gain table.

8. The method of claim 1 wherein the elements of the first threshold array have a depth of 16 bits and the elements of the second threshold array have a depth of 8 bits.

9. The method of claim 1 wherein the plurality of bit patterns is stored as separate arrays.

10. The method of claim 1 wherein the plurality of bit patterns is generated according to a fixed sequence.

11. The method of claim 1 wherein the bit pattern selected from the plurality of bit patterns for the particular gray level value is that bit pattern whose measured gray value best approximates the particular gray level value.

12. The method of claim 1 wherein the compensation function corresponding to the predetermined transfer characteristic is a dot gain compensation function.

13. The method of claim 1 wherein the compensation function is the inverse of the function obtained from measuring actual output gray levels for selected bit patterns.

* * * * *